United States Patent
Guibert et al.

(10) Patent No.: US 7,959,106 B2
(45) Date of Patent: Jun. 14, 2011

(54) INTEGRATED PROPULSIVE SYSTEM COMPRISING A BYPASS TURBOJET ENGINE

(75) Inventors: Thibaud Jean-Baptiste Guibert, Paris (FR); Guillaume Lefort, Paris (FR); Marc Patrick Tesniere, Champcueil (FR)

(73) Assignee: SNECMA, Paris (FR)

( * ) Notice: Subject to any disclaimer, the term of this patent is extended or adjusted under 35 U.S.C. 154(b) by 423 days.

(21) Appl. No.: 11/856,468

(22) Filed: Sep. 17, 2007

(65) Prior Publication Data

US 2008/0073461 A1  Mar. 27, 2008

(30) Foreign Application Priority Data

Sep. 20, 2006  (FR) .................................... 06 08218

(51) Int. Cl.
- *B64D 29/00* (2006.01)
- *B64D 29/08* (2006.01)
- *B64C 7/02* (2006.01)

(52) U.S. Cl. ...................... 244/54; 244/53 R; 244/129.4

(58) Field of Classification Search .................... 244/54, 244/53 R, 53 B, 129.4, 129.5, 110 B; 60/797, 60/798; 248/554
See application file for complete search history.

(56) References Cited

U.S. PATENT DOCUMENTS

| | | | | |
|---|---|---|---|---|
| 2,944,766 A | * | 7/1960 | Freeding et al. | 244/54 |
| 4,055,041 A | * | 10/1977 | Adamson et al. | 244/54 |
| 4,365,775 A | * | 12/1982 | Glancy | 244/54 |
| 5,350,136 A | * | 9/1994 | Prosser et al. | 244/129.4 |
| 5,524,847 A | | 6/1996 | Brodell et al. | |
| 6,170,253 B1 | * | 1/2001 | Newton | 60/226.2 |
| 6,220,546 B1 | * | 4/2001 | Klamka et al. | 244/129.4 |
| 2007/0267539 A1 | * | 11/2007 | Bulin | 244/53 R |
| 2007/0278345 A1 | * | 12/2007 | Oberle et al. | 244/53 R |

FOREIGN PATENT DOCUMENTS

| | | |
|---|---|---|
| EP | 0 453 360 A1 | 10/1991 |
| FR | 2 757 823 | 7/1998 |
| GB | 2 259 954 A | 3/1993 |
| WO | WO 94/24430 | 10/1994 |

OTHER PUBLICATIONS

U.S. Appl. No. 12/103,258, filed Apr. 15, 2008, Dron, et al.*
U.S. Appl. No. 11/857,735, filed Sep. 19, 2007, Guibert, et al.

* cited by examiner

*Primary Examiner* — Tien Dinh
*Assistant Examiner* — Richard R Green
(74) *Attorney, Agent, or Firm* — Oblon, Spivak, McClelland, Maier & Neustadt, L.L.P.

(57) ABSTRACT

An integrated propulsive turbofan engine system includes a downstream cylindrical nacelle structure in two parts. The first of the two parts is fixed and fastens engine attachment elements and an intermediate casing to the aircraft. The second of the two parts may move between a closed position used during operation and an open position during maintenance when access to engine components is needed.

17 Claims, 3 Drawing Sheets

INTEGRATED PROPULSIVE SYSTEM COMPRISING A BYPASS TURBOJET ENGINE

BACKGROUND OF THE INVENTION AND DESCRIPTION OF THE PRIOR ART

The invention relates to an integrated propulsive system for an aircraft, comprising a bypass turbojet engine and comprising a nacelle which is borne by an intermediate engine casing and defines a flow space for a secondary stream around the turbojet, this secondary stream being intended to provide more than 80% of the thrust.

The engine is generally attached under a wing or to a part of the fuselage or to a part of the tail section of the aircraft by means of a pylori, which is a very sturdy and very heavy component and which is fastened to the engine at a number of points via suspensions through which pass all the loads transmitted between the engine and the aircraft.

Fastening by means of a pylori and suspensions also entails a thrust absorption offset with respect to the axis of the engine, resulting in an overall bending in the line of the engine casings. Furthermore, the pylori is fastened to the engine by elements which cross and partially obstruct the flow path for the secondary stream inside the nacelle, this leading to a corresponding increase in the radial dimensions of the nacelle even though the aircraft manufacturers would rather reduce these dimensions, in particular in the case of engines with a high bypass ratio.

SUMMARY OF THE INVENTION

The subject of the present invention is a propulsive system of the above-described type which avoids the aforementioned drawbacks of the prior art in a simple, effective and economic manner and which additionally facilitates the maintenance operations to which the engine is periodically subject.

To this end, the invention provides an integrated propulsive system for an aircraft, comprising a bypass turbojet engine and a nacelle which is borne by an intermediate casing which defines an annular flow space for a secondary stream around the turbojet, wherein the nacelle comprises a downstream cylindrical structure in two parts, one of which is a fixed framework comprising means for fastening engine attachment elements to a part of the aircraft, and also means for fastening to the intermediate casing, and the other of which is a moveable part which is borne by the fixed framework and able to move between a service position in which it is applied to the fixed framework for the operation of the engine, and an open position in which it is moved away from the fixed framework to allow access to engine components, locking means being provided to secure the moveable part to the fixed framework in the service position so as to strengthen the downstream structure of the nacelle and improve the transmission of loads from the engine to the aircraft.

This downstream cylindrical structure of the nacelle, termed outer fixed structure (OFS) in the art, has a strength which allows a transmission of loads between the engine and the aircraft. Its fastening to the intermediate engine casing allows it to fully support the engine and to eliminate the pylori used in the prior art, which is replaced by much lighter means for attaching to the aircraft, thus resulting in a considerable weight saving. Furthermore, the configuration of the downstream cylindrical structure of the nacelle in two parts, one of which is moveable, provides a way of gaining access to internal components of the turbojet for maintenance purposes, without having to disassemble the whole of this downstream cylindrical structure.

It is possible for the moveable part to be able to move rotationally and/or translationally with respect to the fixed framework.

In a preferred embodiment of the invention, the moveable part is formed by two semicylindrical lattices articulated on the fixed framework around longitudinal axes allowing them to move between the service position and the maintenance position. Fairing or cowling panels are mounted on these lattices and form an external wall for guiding the secondary stream generated by the engine fan.

The engine according to the invention may or may not be equipped with a thrust reverser. In the first case, the two semicylindrical lattices are perforated in order that the secondary stream generated by the fan can be deflected through these lattices during the operation of the thrust reverser. The fairing or cowling panels mounted on the two semicylindrical lattices are thus able to move translationally between an upstream position in which they block the perforated parts of the two lattices, and a downstream position in which they expose these perforated parts and allow the operation of the thrust reverser.

According to the invention, the lattices may open at an angle of between 40 degrees and 180 degrees with respect to the fixed framework so as to offer easy access to the inside of the engine during maintenance.

The invention also relates to a downstream cylindrical structure of a nacelle of an integrated propulsive system of the above-described type, which comprises two parts, one of which is a fixed framework comprising means for fastening engine attachment elements to a part of the aircraft, and also means for fastening to the intermediate casing, and the other of which is a moveable part borne by the fixed framework and formed by two semicylindrical lattices articulated about two longitudinal axes on the fixed framework.

In one particular embodiment of the invention, the two semicylindrical lattices are perforated and fairing or cowling panels are mounted so that they can slide longitudinally on these lattices.

Generally, the propulsive assembly according to the invention may be fastened by the aforementioned means to any part of an aircraft, for example under a wing, on a wing, on a structure integrated with the wing, on the fuselage or on the tail section of the aircraft.

BRIEF DESCRIPTION OF THE DRAWINGS

Other advantages and features of the invention will become apparent on reading the description below which is given by way of nonlimiting example and with reference to the appended drawings, in which.

DESCRIPTION OF THE PREFERRED EMBODIMENTS

Figure 1:
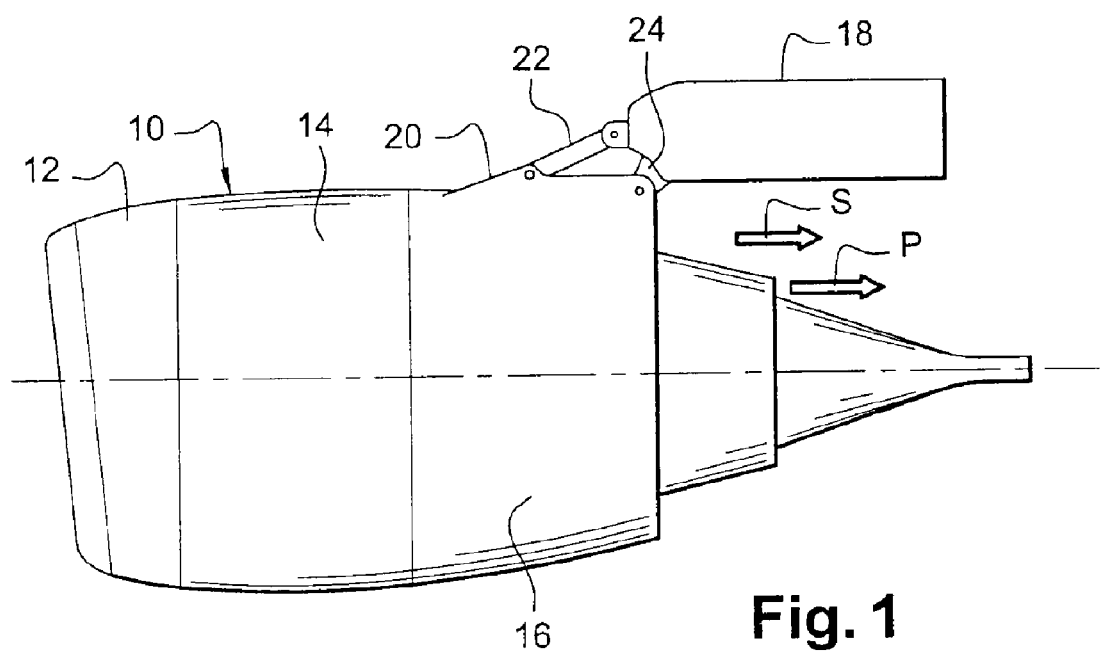
FIG. 1 is a side view of a system according to the invention.

The propulsive bypass turbojet engine system which is schematically represented in FIG. 1 essentially comprises a nacelle 10 of cylindrical shape which surrounds a fan wheel at its upstream part, and a turbojet of which only the rear part is visible in FIG. 1, the fan wheel being caused to rotate by the turbine of the turbojet in a manner which is well known to a person skilled in the art.

During the operation of the engine, the fan generates a secondary air stream which flows rearward inside the nacelle 10 around the turbojet and which supplies 80% of the engine thrust. Some of the air entering the engine supplies the inlet compressor of the turbojet and is then mixed with fuel in the combustion chamber. The combustion gases leaving the combustion chamber pass into the turbine and are then expelled into an exhaust casing and exit the turbojet as indicated by the arrow P in FIG. 1, in which the neighboring arrow S denotes the exiting of the secondary stream.

The engine nacelle 10 comprises an upstream cylindrical part 12, termed air inlet duct, an intermediate cylindrical part 14 formed by cowls borne by the intermediate engine casing, and a downstream cylindrical part 16, generally termed outer fixed structure (OFS) which, according to the invention, is a structuring part which transmits the loads and serves to fasten the engine to a bearing structure 18 forming part, for example, of an aircraft wing.

The downstream part 16 of the nacelle, comprises, as will be seen in more detail in the following, cowling panels fastened to a framework which in its upper part comprises a longitudinal beam 20 serving to fasten engine attachment rods or links 22, 24 to the bearing structure 18. These attachment elements 22, 24 constitute a rigid and nondeformable assembly when their ends are fastened to the beam 20 and to the bearing structure 18.

This method of fastening the engine to a part of the aircraft makes it possible to eliminate the pylori traditionally used in the prior art, which is a heavy component and one in which the points where it is fastened to the engine create body structure distortions and partially obstruct the flow area of the secondary stream in the nacelle 10, thus leading to an increase in the diameter of this nacelle and constituting a drawback in the eyes of the aircraft manufacturers.

Figure 2:
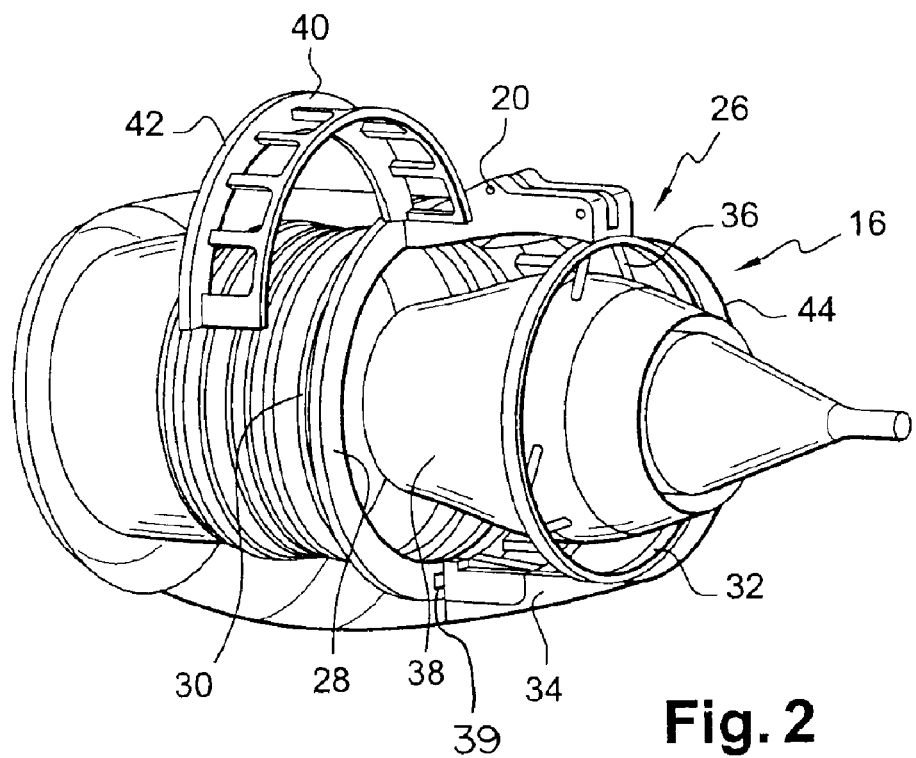
FIG. 2 is a schematic perspective view with partial cutaway of a system according to the invention, in a maintenance position.
Figure 3:
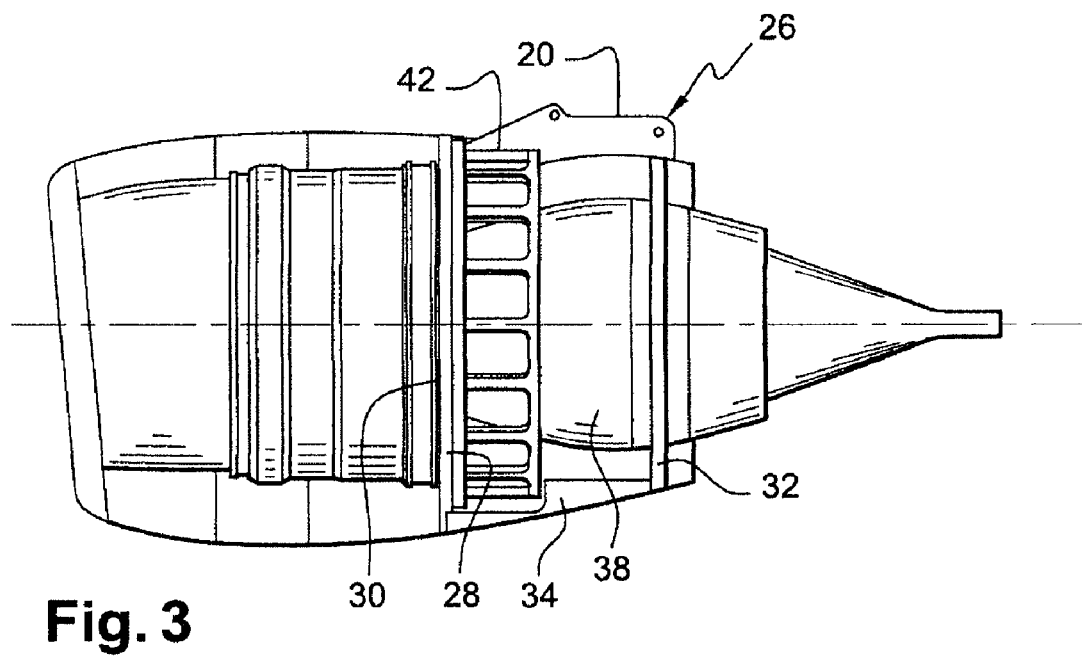
FIG. 3 is a schematic side view in partial section of the system shown in FIG. 2, in an operating position.
Figure 4:
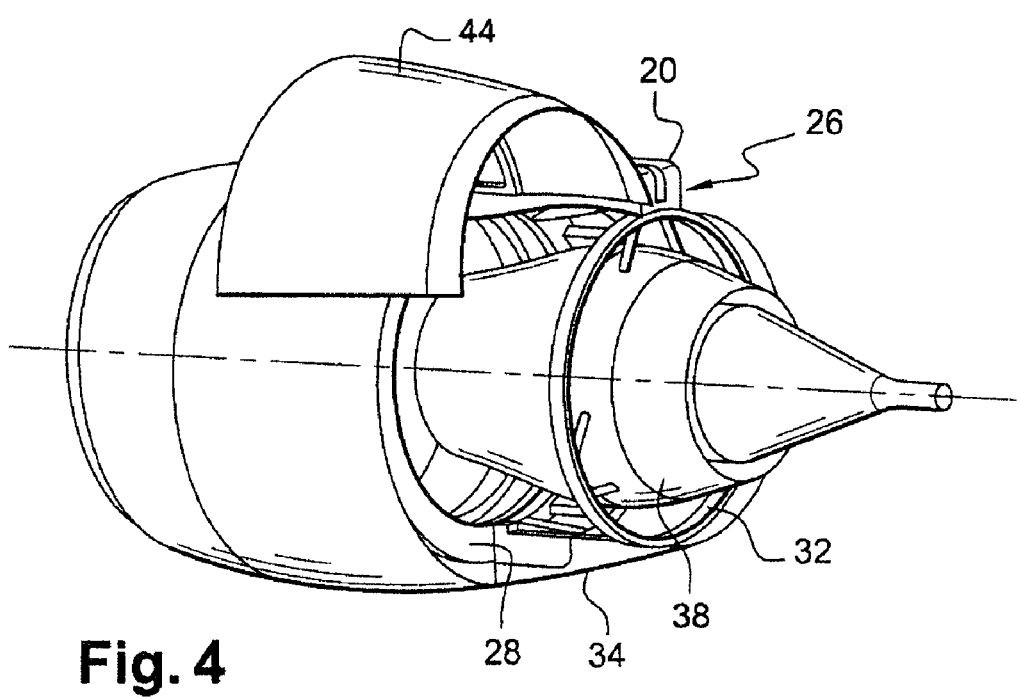
FIG. 4 is another schematic perspective view without partial cutaway of the system shown in FIGS. 2 and 3, in a maintenance position.

As can be seen more clearly in FIG. 2, the frame or framework 26 of the downstream cylindrical part 16 of the nacelle comprises an upstream annular flange 28 by which it can be fastened to at least a part of the periphery of an external annular flange 30 of the intermediate engine casing, this fastening, which is performed by bolting, extending at least over 180° around the axis of the engine, and preferably over 360°, that is to say all around the circumference of the annular flange 30.

The frame 26 also comprises a downstream annular part 32, which is connected to the upstream annular flange 28 by the aforementioned longitudinal beam 20 and by a lower longitudinal strut 34 diametrically opposed to the beam 20. The downstream annular part 32 can be connected by links or connecting rods 36 to the downstream end part of a cylindrical case 38, generally termed inner fixed structure (IFS) in the art, this case constituting the internal guide surface for the secondary stream.

Advantageously, this internal cylindrical case 38 may be a rigid part whose upstream end is fastened by bolting to an internal annular flange of the intermediate engine casing and thus also serves to reduce the body structure distortions.

The downstream cylindrical part 16 of the nacelle comprises, according to the invention, the aforementioned frame or framework 26, which is mounted fixedly on the engine, and another part which is able to move with respect to the first one and which is borne by said first part, this other part consisting, in the example represented in FIG. 2, of two semicylindrical lattices 40 which are articulated at one of their ends to the beam 20 about longitudinal axes, one on either side of this beam. Each lattice 40 is able to pivot about its articulation axis over an angle of between 40 and 180° approximately, so as to give access to the internal cylindrical case 38 and to the turbojet so as to facilitate maintenance work on the underwing engine.

When the engine is not equipped with a thrust reverser, each lattice 40 may comprise any kind of framework or frame to which are fastened cowling or fairing panels.

When the engine is equipped with a thrust reverser, these lattices can bear the thrust reverser and consist of a perforated framework 42 forming a lattice which allows the fastening of the thrust reverser cascades and cowling panels 44 mounted externally on this framework so as to be able to slide longitudinally thereon, between an upstream position in which they block the outlet cascade of the thrust reverser and a downstream position in which they expose this outlet cascade so as to allow the operation of the thrust reverser.

Locking means 39 of a known type, for example with hooks, with jaws or with claws, are provided to keep the semicylindrical lattices 40 in position when they are in their service position on the frame 26 of the downstream cylindrical part 16 of the nacelle. These locking means may be arranged on the upstream annular flange 28 of the frame 26 and/or on the longitudinal strut 34 diametrically opposed to the beam 20. Supplementary means of connection between the fixed framework 26 and the moveable part formed by the two semicylindrical lattices 40, such as means of the type known by the name of "V-groove", may be used to provide load transmission between these two parts when the moveable part is in the service position during the operation of the engine.

Figure 5:
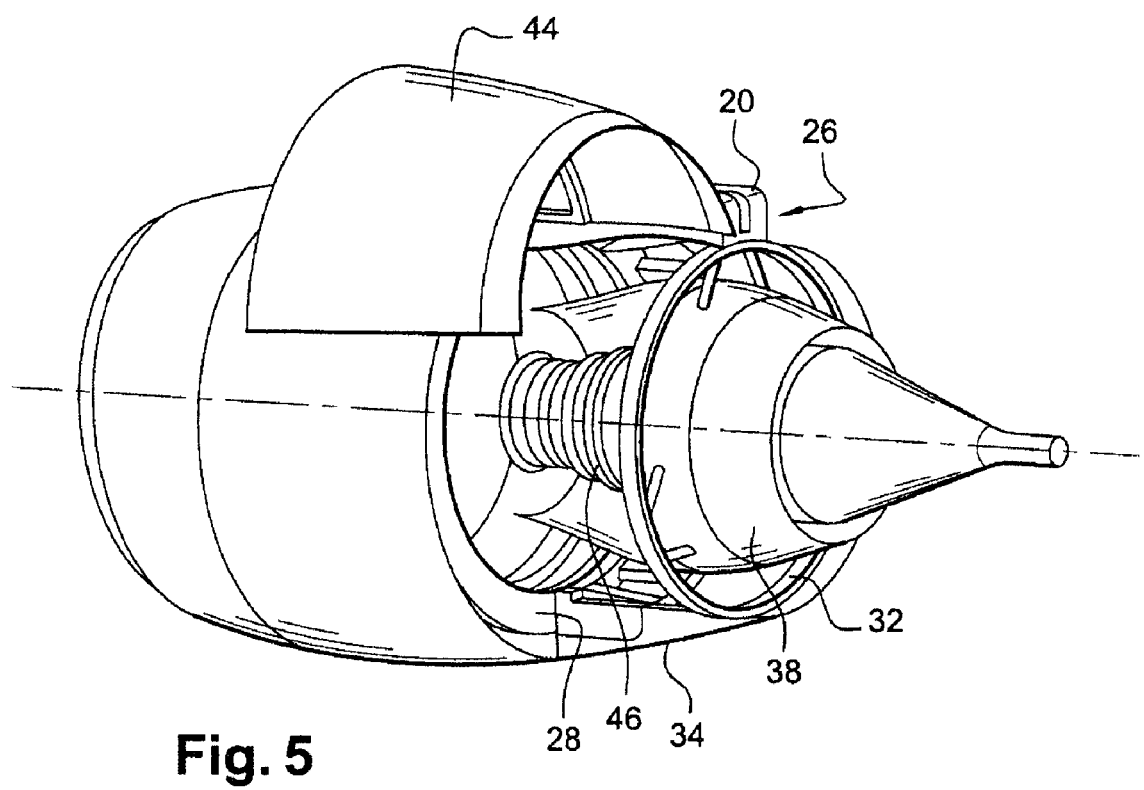
FIG. 5 is an another schematic perspective view of the system shown in FIG. 4.

The construction of the downstream cylindrical part 16 of the nacelle in two parts, respectively a fixed part and moveable part, greatly facilitates maintenance work on the underwing engine of the aircraft, this maintenance work being all the more feasible since the internal cylindrical case 38 or IFS also comprises removable panels, as represented in FIG. 5, for direct access to a certain number of components of the turbojet represented schematically as 46.

The invention claimed is:

1. An integrated propulsive system for an aircraft, comprising:
  a turbofan engine, including an intermediate casing; and
  a nacelle which bears the intermediate casing of the turbofan engine which defines an annular flow space for a secondary stream around the turbofan engine, the nacelle comprises a downstream cylindrical structure which includes
    a fixed framework which is fastened via engine attachment elements to a part of the aircraft and which is fastened to the intermediate casing of the turbofan engine, and
    a moveable part which is borne by the fixed framework and which moves between a closed position during operation of the turbofan engine and an open position in which the movable part is moved to allow access to engine components,
  wherein the system includes a locking device which secures the moveable part to the fixed framework in the closed position,
  wherein the fixed framework includes a downstream annular part in the shape of an annulus and the secondary stream travels through the downstream annular part, and wherein the fixed framework includes an upstream annular flange which is fastened to an external annular flange of the intermediate casing of the turbofan engine.

2. The propulsive system as claimed in according to claim 1, wherein the moveable part moves at least one of rotationally or translationally with respect to the fixed framework.

3. The propulsive system as claimed in claim 2, wherein components of the locking device are mounted on the upstream annular flange and on a longitudinal strut of the fixed framework.

4. The propulsive system as claimed in claim 3, wherein the moveable part comprises two semicylindrical lattices that are articulated around longitudinal axes on the fixed framework.

5. The propulsive system as claimed in claim 4, wherein fairing or cowling panels are mounted on the system and the fairing or the cowling panels slide longitudinally on the two semicylindrical lattices to allow an operation of a thrust reverser.

6. The propulsive system as claimed in claim 5, wherein the lattices open at an angle within a range from 40 degrees to 180 degrees with respect to the fixed framework.

7. The propulsive system as claimed in claim 6, further comprising:
a substantially cylindrical case which provides an internal guide surface for the secondary stream, an upstream end of the substantially cylindrical case is fastened to the intermediate casing, a downstream end of the substantially cylindrical case which supports an exhaust casing, the exhaust casing guides a combustion flow that has exited from a turbine of the turbofan engine, and the substantially cylindrical case includes removable panels which allow access to the engine components.

8. The propulsive system as claimed in claim 4, wherein the lattices open at an angle within a range from 40 degrees to 180 degrees with respect to the fixed framework.

9. The propulsive system as claimed in claim 1, wherein components of the locking device are mounted on the annular flange and on a longitudinal strut of the fixed framework.

10. The propulsive system as claimed in claim 1, wherein the moveable part comprises two semicylindrical lattices that are articulated around longitudinal axes on the fixed framework.

11. The propulsive system as claimed in claim 1, further comprising:
a substantially cylindrical case which provides an internal guide surface for the secondary stream, an upstream end of the substantially cylindrical case is fastened to the intermediate casing, a downstream end of the substantially cylindrical case which supports an exhaust casing, the exhaust casing guides a combustion flow that has exited from a turbine of the turbofan engine, and the substantially cylindrical case includes removable panels which allow access to the engine components.

12. The propulsive system as claimed in claim 1, wherein the moveable part pivots from the fixed framework.

13. The propulsive system as claimed in claim 1, wherein the upstream annular flange is fastened to the external annular flange of the intermediate casing of the turbofan engine around an entire circumference of the external annular flange of the intermediate casing of the turbofan engine.

14. A downstream cylindrical structure of a nacelle for an integrated propulsive system attached to an aircraft, the integrated propulsive system including a turbofan engine which includes an intermediate casing, the downstream cylindrical structure comprising:
a fixed framework which is fastened via engine attachment elements to a part of the aircraft and which is fastened to the intermediate casing of the turbofan engine; and
a moveable part which includes two semicylindrical lattices articulated about longitudinal axes on the fixed framework, the moveable part is supported by the fixed framework and which moves between a closed position in which the movable part is fully attached to the fixed framework during an operation of a turbofan engine and an open position in which the movable part is moved to allow access to engine components, and the moveable part includes a locking device which secures the moveable part to the fixed framework in the closed position,
wherein the nacelle bears the intermediate casing of the turbofan engine, and the nacelle defines an annular flow space for a secondary stream around the turbofan engine,
wherein the fixed framework includes a downstream annular part in the shape of an annulus, and the downstream annular part permits the secondary stream to travel through the downstream annular part, and
wherein the fixed framework includes an upstream annular flange which is fastened to an external annular flange of the intermediate casing of the turbofan engine.

15. The downstream cylindrical structure as claimed in claim 14, wherein the two semicylindrical lattices are perforated.

16. The downstream cylindrical structure as claimed in claim 15, further comprising cowling panels which are mounted on the two semicylindrical lattices and which slide longitudinally on the two semicylindrical lattices.

17. The downstream cylindrical structure as claimed in claim 14, further comprising cowling panels which are mounted on the two semicylindrical lattices and which slide longitudinally on the two semicylindrical lattices.

* * * * *

UNITED STATES PATENT AND TRADEMARK OFFICE
CERTIFICATE OF CORRECTION

| | | |
|---|---|---|
| PATENT NO. | : 7,959,106 B2 | Page 1 of 1 |
| APPLICATION NO. | : 11/856468 | |
| DATED | : June 14, 2011 | |
| INVENTOR(S) | : Thibaud Jean-Baptiste Guibert et al. | |

It is certified that error appears in the above-identified patent and that said Letters Patent is hereby corrected as shown below:

Column 1, line 17, change "pylori" to --pylon--;

Column 1, line 21, change "pylori" to --pylon--;

Column 1, line 24, change "pylori" to --pylon--;

Column 1, line 62, change "pylori" to --pylon--;

Column 2, line 60, delete "an" before "another";

Column 3, line 33, change "pylori" to --pylon--.

Signed and Sealed this

Twenty-seventh Day of September, 2011

David J. Kappos
*Director of the United States Patent and Trademark Office*